United States Patent Office 3,520,175
Patented July 14, 1970

3,520,175
GAUGING DISTANCE BETWEEN TWO SURFACES
Royds Sharp and Malcolm Bath, Glasgow, Scotland, assignors to National Research Development Corporation, London, England, a corporation of Great Britain
Filed Dec. 1, 1967, Ser. No. 687,381
Claims priority, application Great Britain, Dec. 2, 1966, 54,158/66
Int. Cl. G01b *13/12*
U.S. Cl. 73—37.8
12 Claims

ABSTRACT OF THE DISCLOSURE

Method and apparatus for measuring the chord distance between similar points on similar flanks of two teeth of a gear wheel using two pneumatic proximity gauges mounted a fixed distance apart for movement into and out of the valleys between the teeth. The gauges provide pneumatic signals related to the respective distances between the gauges and the gear flanks. The pneumatic signals are applied to a differential pressure transducer which provides an electrical signal which, over an operating range, is related to the difference between the distance between the sensed gear teeth flanks and the distance between the proximity gauges. Since the distance between the gauges is known, the output signal of the differential pressure transducer can be used to provide an error indication.

---

This invention relates to the gauging of distance between two surfaces.

According to one aspect of the present invention there is provided a method of indicating and/or measuring the distance between a first surface and a second surface, said method including directing fluid on to or withdrawing fluid from the first surface through a first conduit, directing fluid on to or withdrawing fluid from the second surface through a second conduit, deriving a first output signal representative of the pressure in the first conduit, applying the first output signal to a first input of a differential pressure transducer, deriving a second output signal representative of the pressure in the second conduit, applying the second output signal to the second input of the differential pressure transducer, and utilising the output signal from the differential pressure transducer, which is representative of the difference between the first and second output signals, as a measure of the difference between the distance between the two surfaces and the distance between the discharge ends of the two conduits.

According to another aspect of the present invention there is provided apparatus for indicating and/or measuring the distance between a first surface and a second surface, said apparatus comprising a first conduit through which fluid may be directed on to or withdrawn from the first surface, a second conduit through which fluid may be directed on to or withdrawn from the second surface, a differential pressure transducer arranged to receive as its first input a first output signal representative of the pressure in the first conduit and arranged to receive as its second input a second output signal representative of the pressure in the second conduit, and adapted to provide an output signal which is representative of the difference between the first and second output signals and of the difference between the distance between the two surfaces and the distance between the discharge ends of the two conduits.

The invention will now be described, by way of example, with reference to the accompanying drawings, in which.

Figure 1:
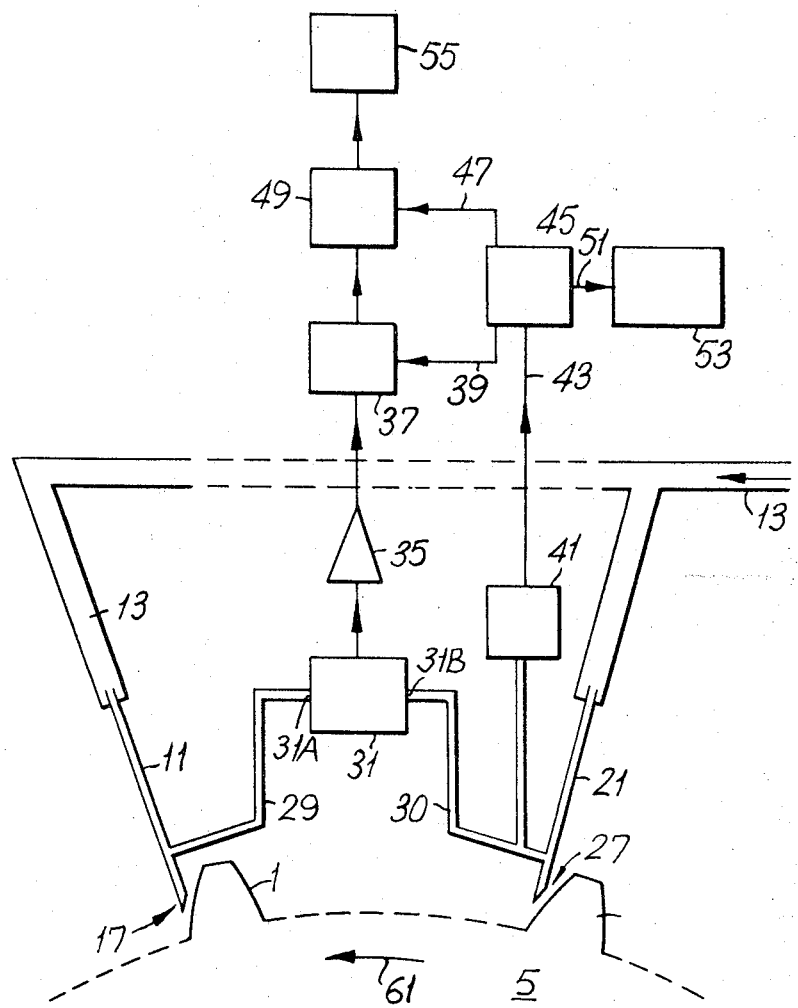
FIG. 1 is a diagrammatic representation of means for measuring deviations from a normal value of the pitch circle distances between corresponding parts of two teeth of a gear wheel.

In the drawing, only two teeth 1 and 3 of a gear wheel 5 are shown, it being understood that the gear wheel is a normally-toothed gear wheel and that the intention is to measure in turn the pitch-circle distance between each tooth and a further tooth which, in the form of the embodiment being described, is three teeth further on.

A first pneumatic proximity gauge has a capillary tube conduit 11 which is supplied with air under pressure from a source 13 and is arranged to discharge that air through its discharge end 17 adjacent the gear wheel tooth 1 in a direction normal to the adjacent flank surface of the gear wheel tooth 1. A second pneumatic proximity gauge has a capillary tube conduit 21 which is supplied with air under pressure from the source 13 and is arranged to discharge that air through its discharge end 27 adjacent the gear wheel tooth 3 in a direction normal to the adjacent flank surface of the gear wheel tooth 3. With this arrangement, the air pressure at an intermediate point in each conduit will vary, over a small range of clearances between the discharge end and the associated tooth, in accordance with that clearance. The conduit 11 is connected to a first input 31A of a differential pressure transducer 31, and the conduit 21 is connected to the second input 31B of that transducer 31.

The transducer 31 is of a type which provides an electrical output signal proportional over a working range to the difference in the pressures applied respectively to its two inputs. This electrical output is applied to an electronic amplifier 35 which in turn supplies an input to a "sample and hold" circuit 37. This circuit 37 when supplied with a signal through a lead 39 samples the voltage instantaneously on the output from the amplifier 35 and holds that voltage until a further signal on the lead 39 causes it to resample that voltage. The pressure in conduit 21 is also applied to a pressure transducer 41 which provides in lead 43 a signal indicative of the pressure in that conduit. Lead 43 is connected to a "level detector" circuit 45 which has a first stable state and a second stable state and switches from the first state to the second state as the input signal on lead 43 reaches a predetermined level. When this happens, the level detector circuit provides an output signal on lead 39 controlling the "sample and hold" circuit 37, on a lead 47 controlling the activation of a digital voltmeter 49, and on a lead 51 controlling the activation of a release mechanism 53 which moves the two conduits 11 and 21 clear of the teeth of the gear wheel 1. The output from the "sample and hold" circuit 37 is applied to the input of the digital voltmeter 49, and the output of that voltmeter is applied to a print-out mechanism 55.

In use of the apparatus described above, the gear wheel 5 is slowly rotated in the direction indicated by the arrow 61, so that the two teeth 1 and 3 slowly approach the discharge ends 17 and 27 of the two conduits 11 and 21 respectively. Once the clearances involved have become sufficiently small, the restriction of the two discharges will cause pressure to build up in the two conduits, and these pressures are applied to the differential pressure transducer 31. If the spacings of the two discharge ends 17 and 27 from the associated teeth are equal, corresponding to the case of perfect tooth spacing, the output from transducer 31 will remain constant. If the spacing is incorrect, the output signal will rise accordingly. When the gear wheel tooth 3 has approached the discharge end 27 of conduit 21 sufficiently closely, the increased pressure in the conduit 21 will cause the output from the pressure transducer 41 to rise to a sufficient value to operate the level detector circuit 45, so causing the circuit 37 to sample the voltage output from the amplifier 35, the digital voltmeter 49 to indicate that voltage, and the print-out mechanism 55 to print out a permanent record of the voltage. It will be appreciated that if desired the voltmeter and the print-out mechanism can be arranged to provide outputs directly indicative of linear measurements, rather than voltages which require interpretation. Almost immediately the release mechanism 53 operates to cause the conduits to be withdrawn from the valleys between the teeth of the gear wheel 1, and after a suitable short delay these conduits are relowered into the valleys between the next pairs of teeth, to carry out a measuring operation on those teeth.

Figure 2:
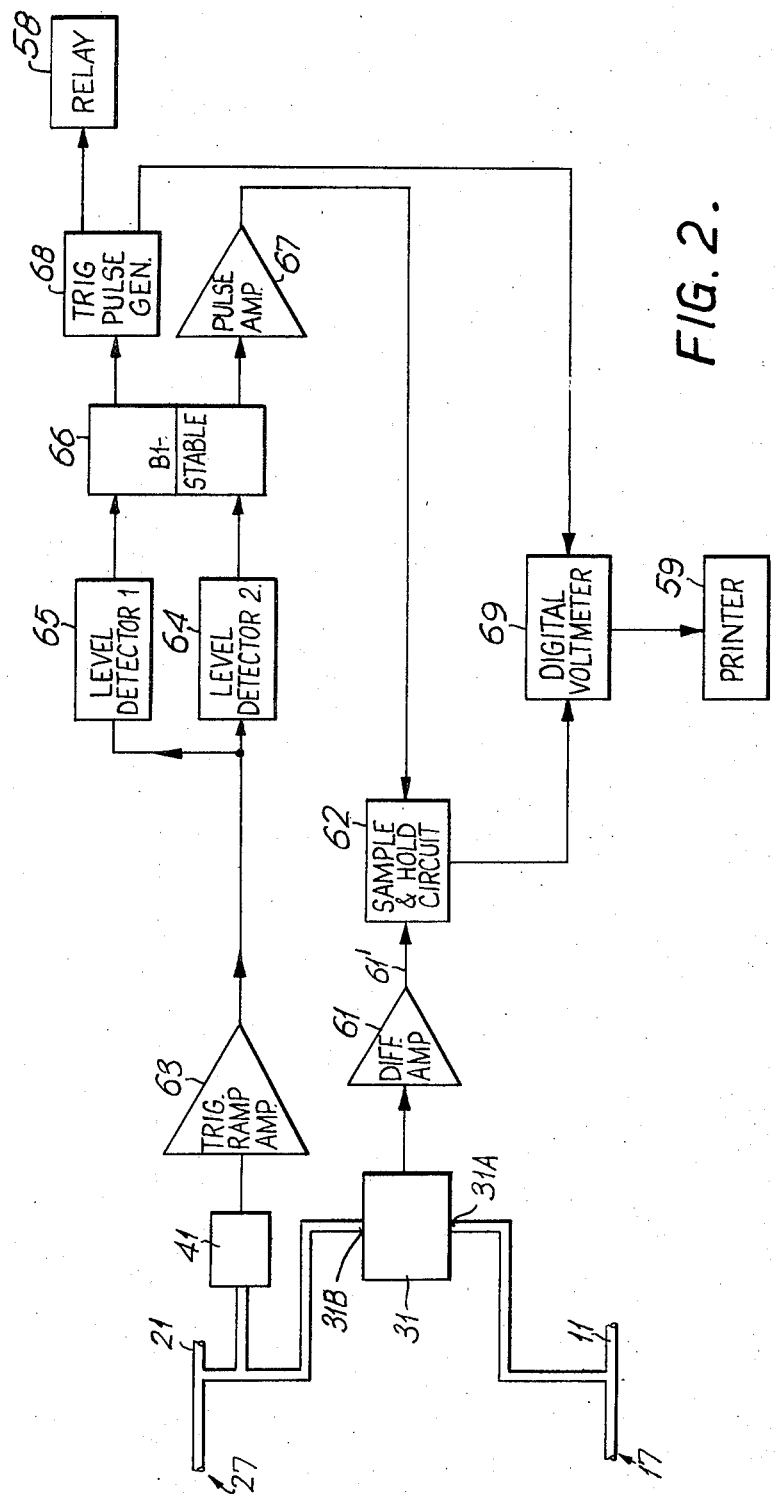
FIG. 2 illustrates diagrammatically an electrical circuit which is an alternative to that illustrated in FIG. 1.

FIG. 2 illustrates an electrical circuit alternative to that illustrated in FIG. 1.

In this circuit the output from the differential pressure transducer is amplified in an amplifier 61 and passed thence to a sample and hold circuit 62 the function of which will be described.

The output of transducer 41 is amplified in an amplifier 63 the output of which is fed to two level detectors 64 and 65 which respectively set and reset a bistable circuit 66. When bistable circuit 66 is in the set condition, a control signal is applied to the sample and hold circuit 62 through a pulse amplifier 67. The resetting of bistable circuit 66 operates a trigger pulse generator 68 which triggers the read-out of a digital voltmeter 69 to a printer 59 and in addition energises relay 158 which causes the gauges to be moved out of the path of the gear teeth.

The electronic circuit of FIG. 2 is, like the circuit of FIG. 1, designed to cause measurement of the variations in positions of the relevant gear tooth flanks relative to the gauges at periods of time determined by the position of one gear tooth flank relative to the adjacent gauge. The determination of the periods of time at which measurement takes place is achieved by taking the output of amplifier 63, which is a D.C. voltage increasing with time, and represents the instantaneous position of the flank of a gear tooth, and applying it to the two level detectors 64 and 65. Level detector 64 provides an output signal when the input voltage reaches a particular level corresponding to a particular position of a gear tooth flank. The output from level detector 64 determines the commencement of a time period of measurement and sets bistable circuit 66 so as to cause operation of the sample and hold circuit 62 to measure the output of difference amplifier 61 in a manner to be described. As the gear wheel continues to rotate the magnitude of the voltage output from amplifier 63 increases until eventually it reaches a level sufficient to trigger level detector 65. The output of level detector 65 determines the end of a time period of measurement and resets bistable circuit 66 to stop the operation of sample and hold circuit 62 and at the same instant triggers digital voltmeter 69 to read out the voltage standing at that instant in circuit 62. It will thus be seen that measurement is commenced when a gear tooth flank has reached a predetermined position relative to the outlet 27 and continues for a time corresponding to the movement of the tooth by a predetermined distance.

Figure 3:
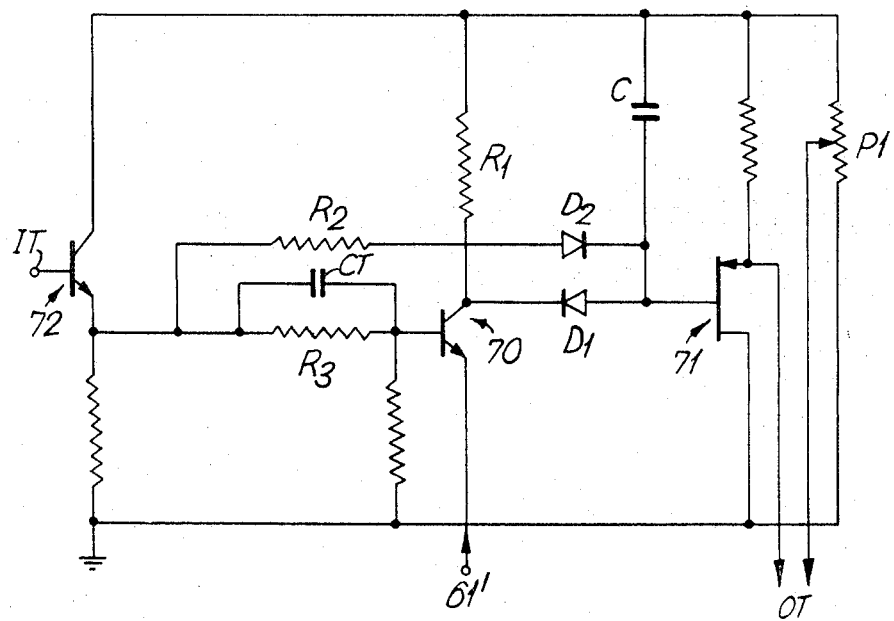
FIG. 3 is a circuit diagram of a capacitative store included in the circuit illustrated in FIG. 2.

Sample and hold circuit 62 is shown in greater detail in FIG. 3. This circuit comprises a transistor 70 having a collector load resistor $R_1$ across which is connected a capacitor C in series with a diode $D_1$. The junction between capacitor C and diode $D_1$ is connected through a diode $D_2$ and a Resistor $R_2$ to the output of an emitter follower stage comprising a transistor $T_3$. The output of pulse amplifier 67 (FIG. 2) is applied to input terminal IT of the circuit. The output of the emitter follower stage is applied to the base of transistor 70 through a resistor $R_3$ paralleled by a capacitor $C_1$. The junction between capacitor C and the diodes $D_1$ and $D_2$ is connected to the base of a field-effect transistor 71 connected as a common source amplifier. The output of the circuit is then taken from the source of transistor 71 to one of a pair of output terminals OT connected to the digital voltmeter 69. The other output terminal is connected to a potentiometer $P_1$ which enables the reading of the digital voltmeter 69 to be referred to any given datum. The voltage to be measured is applied at input terminal 61' connected to the emitter of transistor 70.

In the quiescent state of the circuit in the absence of a sampling pulse at terminal IT transistor 70 is cut off due to the fact that its base is effectively earthed. The arrival of a sampling pulse caused by the setting of bistable circuit 20 raises the potential of input terminal IT sufficiently to saturate transistor 72 and hence transistor 70. Accordingly, the collector of transistor 70 takes on a potential of V volts, where V is the voltage input at terminal 61' obtained from difference amplifier 61. The voltage across the collector load resistor $R_1$ of transistor 70 is $V_1-V$, where $V_1$ is the supply voltage. Both diodes $D_1$ and $D_2$ now conduct. If the voltage across capacitor C is less than $V_1-V$, capacitor C will charge towards this value through conducting diode $D_1$. Should the potential of capacitor C be greater than $V_2-V$, then it should be noted that a discharge path is set up through diode $D_2$ and resistor $R_2$ since the emitter of emitter follower transistor 72 is substantially at the potential of $V_1$ in its saturated state. In either case capacitor C will approach exponentially towards the voltage $V_1-V$ during the time that a sampling pulse is applied.

When the sampling pulse terminates, transistors 72 and 70 cut off so that resistor $R_2$ is returned to a potential which is substantial earth potential. Accordingly, reverse potentials are applied across diodes $D_1$ and $D_2$ and no charge or discharge path exists for the charge on capacitor C. Thus, the potential of capacitor C remains constant between sampling pulses apart from any leakage.

The potential of capacitor C is fed to field-effect transistor 71 and thence to the output terminals of the sample and hold circuit whence it is applied to the digital voltmeter at the end of each sampling period. By choosing low leakage characteristic diodes for diodes $D_1$ and $D_2$ and having the output stage of the sample and hold circuit as a common source field-effect transistor which has as one of its properties a high input impedance, the leakage of charging from capacitor C in the period between samples is kept very low.

It will be noted that since the duration of the sampling pulse is not constant, but is inversely proportional to the speed of passage of the flanks of the gear wheel, the duration of the charge or discharge of the capacitor C in the sample and hold circuit is similarly inversely proportional to speed. This allows compensation of the fact that the difference signal itself is not in practice a constant quantity but is dependent on the speed of rotation of the gear wheel. By compensating for this effect reproducible results are obtained which are independent of gear wheel speed.

An advantage of the use of proximity gauges is that the measuring device does not need to contact the gear teeth, and that the measurement is made not on a point but as an average over a small area, thus minimising the effect of surface defects.

Whilst in the embodiment of the invention chosen for description air is directed under pressure at the surfaces, it is to be understood that air may be withdrawn from the surfaces. However, in cases where there may be loose dirt on the surfaces, it is advantageous to direct air at the surfaces so that dirt is displaced, and hence does not affect the measuring operation.

We claim:
1. A method of indicating and/or measuring the distance between a first surface and a second surface, including:
   providing first and second conduits;
   directing fluid flow so as to create a fluid pressure differential between said first surface and said first conduit;
   directing fluid flow so as to create a fluid pressure differential between said second surface and said second conduit;
   deriving a first output signal representative of said pressure differential between said first surface and said first conduit;
   deriving a second output signal representative of the pressure differential between said second surface and said second conduit;
   providing a differential pressure transducer;
   applying the first and second output signals to said differential pressure transducer;
   deriving an output signal from said differential pressure transducer which is representative of the difference between the said first and second output signals; and
   utilising said output signal of said differential pressure transducer as a measure of the difference of the distance between the two surfaces and the distance between the two conduits.

2. Apparatus for indicating and/or measuring the pitch circle distance between corresponding parts of two gear teeth on a gear wheel, including:
   a first conduit located on said pitch circle for directing fluid flow so as to create a fluid pressure differential between the part of the first gear tooth and said first conduit;
   second conduit located on said pitch circle for directing fluid flow so as to create a fluid pressure differential between the part of the second tooth and said second conduit;
   means for providing first and second output signals representing said fluid pressure differential between said part of said first tooth and said first conduit and said fluid pressure differential between said part of said second tooth and said second conduit respectively; and
   a differential pressure transducer adapted to receive said first and second output signals and to provide an output signal representative of the difference between said first and second output signals and of the difference between the distance between the parts of said first and second teeth and the distance between the conduits.

3. Apparatus as claimed in claim 2, including:
   recording means adapted to receive said output signal from the differential pressure transducer and to record said output signal.

4. Apparatus for indicating and/or measuring the distance between a first and a second surface, including:
   a first conduit for directing fluid flow so as to create a fluid pressure differential between said first surface and said first conduit;
   second conduit for directing fluid flow so as to create a fluid pressure differential between said second surface and said second conduit;
   means adapted to provide first and second output signals representing said fluid pressure differential between said first surface and said first conduit and said fluid pressure differential between said second surface and said second conduit respectively;
   a differential pressure transducer adapted to receive said first and second output signal and to provide an output signal representative of the difference between said first and second output signals and the difference between the distance between the two surfaces and the distance between the conduit;
   a sample and hold circuit adapted to receive said output signal from the differential pressure transducer and having an output; and
   means connected to said output of said sample and hold circuit, adapted to provide a visual indication of said difference in distance.

5. Apparatus for indicating and/or measuring the distance between a first surface and a second surface, including:
   a first conduit for directing fluid flow so as to create a fluid pressure differential between said first surface and said first conduit;
   a second conduit for directing fluid flow so as to create a fluid pressure differential between said second surface and said second conduit;
   means adapted to provide first and second output signals representative of said fluid pressure differential between said first surface and said first conduit and said fluid pressure differential between said second surface and said second conduit respectively;
   a differential pressure transducer adapted to receive said first and second output signals and to provide an output signal representative of the difference between said first and second output signal and of the difference between the distance between the two surfaces and the distance between the conduits;
   a pressure transducer adapted to receive said first output signal, and having an output; and
   a sample and hold circuit connected to said output of said pressure transducer and adapted to be actuated by a signal from said pressure transducer.

6. Apparatus as claimed in claim 5, including:
   indicating means adapted to receive a signal from said sample and hold circuit.

7. Apparatus as claimed in claim 6 including:
   means adapted to record the value of the signal sampled and held by said sample and hold circuit.

8. Apparatus as claimed in claim 7, including:
   a level detector having first and second stable states;
   said level detector being connected to said pressure transducer;
   said sample and hold circuit being connected to said level detector and being adapted to sample and hold said signal from said differential pressure transducer when said level detector is in the first stable state;
   said indicating means being connected to said level detector and being adapted to indicate the value of the signal sampled and held by said sample and hold circuit when said level detector is in the second stable state.

9. Apparatus as claimed in claim 8, including:
   means adapted to move said conduits away from said surfaces;
   said moving means being adapted to be actuated by said level detector when in its second stable state.

10. Apparatus for indicating and/or measuring the pitch circle distance between corresponding surfaces of two teeth of the gear wheel including:
   a first conduit for directing fluid onto a first surface of a first tooth of a gear wheel;
   a second conduit for directing fluid onto a second surface of a second tooth of said gear wheel;
   means for providing first and second output signals representative of the pressures in said first and second conduits respectively;
   a differential pressure transducer for receiving said first and second output signals and for providing a third output signal representative of the difference between said first and second output signals and of the difference between the distance between the two surfaces and the distance between the conduits;
   a second pressure transducer for receiving said first output signal and having an output signal; and
   a sample and hold circuit connected to said output signal of the said second pressure transducer and adapted to be actuated by said output signal from said second pressure transducer.

11. A new use for distance measuring apparatus comprising a first conduit, a second conduit, and means for directing fluid flow through said first and second conduits so as to create a first fluid pressure differential between said first conduit and a first surface and a second fluid pressure differential between said second conduit and a second surface, the magnitude of said first and second differentials being a function of the separations between said first conduit and said first surface and said second conduit and said second surface respectively, including the steps of:

disposing said conduits and a gear wheel having a plurality of teeth so that said first surface is on a first tooth of said wheel and at a given distance from the center of said wheel and said second surface is on a second tooth of said wheel and at said given distance from said center of said wheel, deriving a first output signal from said first differential, deriving a second output signal from said second differential, applying said first and second output signals to a differential pressure transducer to produce a third output signal which is a function of the difference between said first and second output signals, using said third output signal of said pressure transducer to determine the pitch circle distance between said first and second surfaces, including applying said third output signals to a sample and hold circuit which produces a fourth output signal and applying said fourth signal to circuit means for providing a visual indication of said pitch circle distance.

12. A new use for distance measuring apparatus comprising a first conduit, a second conduit, and means for directing fluid flow through said first and second conduits so as to create a first fluid pressure differential between said first conduit and a first surface and a second fluid pressure differential between said second conduit and a second surface, the magnitude of said first and second differentials being a function of the separations between said first conduit and said first surface and said second conduit and said second surface respectively, including the steps of:

disposing said conduits and a gear wheel having a plurality of teeth so that said first surface is on a first tooth of said wheel and at a given distance from the center of said wheel and said second surface is on a second tooth of said wheel and at said given distance from said center of said wheel, deriving a first output signal from said first differential, deriving a second output signal from said second differential, applying said first and second output signals to a differential pressure transducer to produce a third output signal which is a function of the difference between said first and second output signals, using said third output signal of said pressure transducer to determine the pitch circle distance between said first and second surfaces, including applying said first output signal to a pressure transducer which produces a fourth output signal applying said fourth output signal to a level detector having first and second stable states, applying said fourth output signal to a sample and hold circuit connected to said differential transducer so that said sample and hold circuit samples and holds said third signal when said level detector is in said first state, and moving said conduits away from said first and second surfaces when said level detector is in said second state.

References Cited
FOREIGN PATENTS 832,802 4/1960 Great Britain.
926,621 5/1963 Great Britain.

LOUIS R. PRINCE, Primary Examiner

W. A. HENRY, Assistant Examiner